(12) United States Patent
Benito et al.

(10) Patent No.: US 11,667,149 B2
(45) Date of Patent: Jun. 6, 2023

(54) WHEEL CENTER CAPS AND RELATED METHODS

(71) Applicant: Ford Global Technologies, LLC, Dearborn, MI (US)

(72) Inventors: Mauricio Benito, Mexico City (MX); Erick Bautista, Mexico City (MX); Felipe de Jesus Sanchez, Nicolas Romero (MX); Neal Koenig, New Hudson, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 748 days.

(21) Appl. No.: 16/697,792

(22) Filed: Nov. 27, 2019

(65) Prior Publication Data

US 2021/0155034 A1 May 27, 2021

(51) Int. Cl.
*B60B 7/00* (2006.01)
*B60B 7/06* (2006.01)

(52) U.S. Cl.
CPC .......... *B60B 7/0013* (2013.01); *B60B 7/068* (2013.01); *B60B 2360/32* (2013.01); *B60B 2900/211* (2013.01)

(58) Field of Classification Search
CPC ... B60B 7/0013; B60B 7/068; B60B 2360/32; B60B 2900/211
See application file for complete search history.

(56) References Cited

U.S. PATENT DOCUMENTS

| | | | | |
|---|---|---|---|---|
| 2,217,086 A | * | 10/1940 | Whitacre | B60B 7/02 301/35.623 |
| 4,123,111 A | * | 10/1978 | Renz | B60B 7/068 301/37.35 |
| 4,316,638 A | * | 2/1982 | Spisak | B60B 7/10 301/108.4 |
| 4,357,053 A | * | 11/1982 | Spisak | B60B 7/068 301/37.42 |
| D303,103 S | | 8/1989 | Brouch et al. | |
| 5,707,113 A | * | 1/1998 | Russell | B60B 7/14 301/108.4 |
| D498,447 S | | 11/2004 | Kato | |
| 7,004,549 B2 | | 2/2006 | Van Houten et al. | |

(Continued)

OTHER PUBLICATIONS

Midwest Wheelcover, "3556, Center Cap Used, 04-08, Ford F-150, Machined Finish, 6 Fake Lug Nuts, Blue Ford Logo, 6 Lug Nut Clips with Alignment Pin. 7-½" DIA," available at https://www.midwestwheelcover.com/3556centercap.aspx, last retrieved on Apr. 26, 2019 (3 pages).

(Continued)

*Primary Examiner* — Kip T Kotter
(74) *Attorney, Agent, or Firm* — Lorne Forsythe; Hanley, Flight & Zimmerman, LLC

(57) ABSTRACT

Wheel center caps and related methods are disclosed herein. An example wheel center cap includes a body, a first protrusion extending radially outward from the body, and a second protrusion extending radially outward from the body. The first and second protrusions define a gap therebetween. The example wheel center cap includes a leg disposed in the gap and coupled to the body. The leg includes a foot. The foot extends radially outward relative to the body. The foot includes a chamfered face facing away from the body.

20 Claims, 8 Drawing Sheets

(56) References Cited

U.S. PATENT DOCUMENTS

| | | |
|---|---|---|
| 7,300,117 B2 | 11/2007 | Bruce et al. |
| 7,722,128 B2 | 5/2010 | Russell et al. |
| D662,869 S | 7/2012 | Ballard |
| 8,469,459 B2 | 6/2013 | Lauffer |
| D702,174 S | 4/2014 | Gordon |
| 9,242,506 B2 | 1/2016 | Bennett et al. |
| D751,022 S | 3/2016 | Chung |
| D751,489 S | 3/2016 | Chung |
| D761,183 S | 7/2016 | Bennett et al. |
| 9,403,403 B2 * | 8/2016 | Chou .................. B60B 7/04 |
| D767,465 S | 9/2016 | Liffick |
| D803,137 S | 11/2017 | Platto et al. |
| D831,558 S | 10/2018 | Starr, Jr. |
| D838,228 S | 1/2019 | Chung |
| D842,185 S | 3/2019 | Chung |
| D845,863 S | 4/2019 | Chung |
| D847,721 S | 5/2019 | Chung |
| D852,714 S | 7/2019 | Hale, Jr. |
| D852,715 S | 7/2019 | Ash et al. |
| D857,580 S | 8/2019 | Liffick |
| D860,105 S | 9/2019 | Moore et al. |
| D885,296 S | 5/2020 | Hale, Jr. |
| D896,154 S | 9/2020 | Piscitelli |
| D904,965 S | 12/2020 | Horlick |
| D911,246 S | 2/2021 | Lickliter |
| D940,043 S | 1/2022 | Carbis et al. |
| 2005/0168052 A1 * | 8/2005 | Hauler .................. B60B 7/02 |
| | | 301/37.35 |
| 2005/0269863 A1 * | 12/2005 | Hauler ................ B60B 7/068 |
| | | 301/37.35 |
| 2007/0210640 A1 | 9/2007 | Rogers |

OTHER PUBLICATIONS

"Wheel Center Cap—Steel Wheel Winter Time," last retrieved from www.amazon.com on Apr. 25, 2019 (5 pages).

"Volkswagen Wheel Center Cap—Steel Wheel Winter Time," available at https://www.amazon.com/Wheel-Center-Cap-Steel-Winter/dp/B017X099GU, last retrieved on Mar. 31, 2020 (6 pages).

U.S. Appl. No. 29/715,057, filed with the United States Patent and Trademark Office dated Nov. 27, 2019.

United States Patent and Trademark Office, "Non-Final Office Action," dated Aug. 23, 2022 in connection with U.S. Appl. No. 29/715,057, 13 pages.

centercaps.net, "Ford Ranger 2019-2020 Center Cap," retrieved from <https://centercaps.net/products/ford-ranger-19-20-center-cap-3731> on Jul. 28, 2022, 2 pages.

United States Patent and Trademark Office, "Notice of Allowance," dated Jan. 19, 2023 in connection with U.S. Appl. No. 29/715,057, 7 pages.

Ultra Wheel Motorsports, "Sparkoo C800805 A89-9865 Wheel RIM Center Hub Cap," Amazon Canada, 2019, 4 pages.

\* cited by examiner

WHEEL CENTER CAPS AND RELATED METHODS

FIELD OF THE DISCLOSURE

This disclosure relates generally to vehicle wheels and, more particularly, to wheel center caps and related methods.

BACKGROUND

Motor vehicles such as automobiles, trucks, and semi-trailers often include a center cap axially disposed on the exterior of the vehicle's wheels. These center caps serve protective and/or decorative purpose(s). Specifically, center caps can prevent dust, dirt, and debris from entering an axial bore located in the center of the wheel. Center caps may also include branding features (e.g., logos) related to the make or model of the vehicle.

Figure 1:
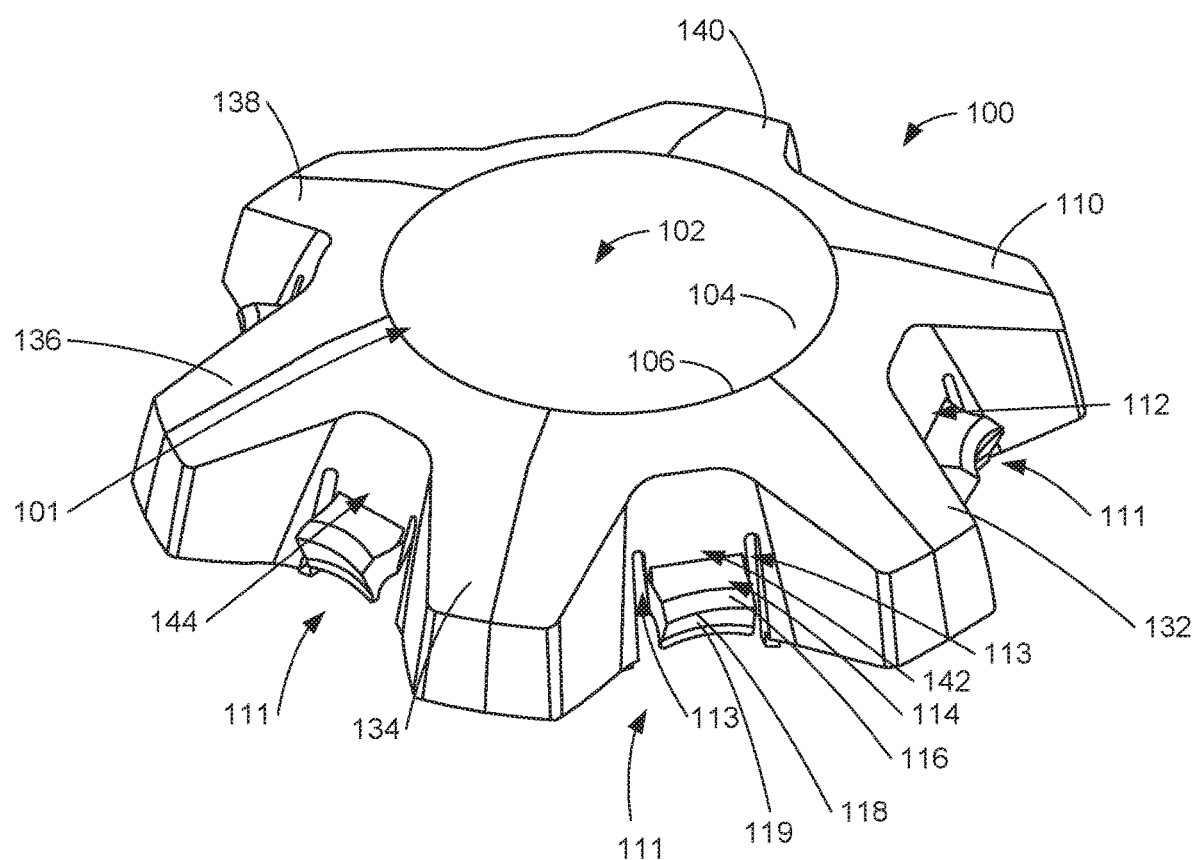
FIG. 1 is an isometric view of an example center cap in accordance with teachings of this disclosure and, in particular, shows a first side of the example center cap.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

A wheel of a vehicle such as an automobile, a truck, or a semi-trailer typically includes a center cap coupled to the wheel hub and covering an axial central bore extending through the wheel. The center cap serves as a covering to prevent dust, dirt, and debris from moving from the exterior of the vehicle into and through the axial central bore of the wheel. The center cap can serve as a primary or redundant means to prevent the accumulation of debris within the interior of the central bore and with respect to other components exposed by the central bore opening.

In addition to providing a protective utility, center caps can also serve as an aesthetic feature of a vehicle. For example, center caps provide means for automotive manufactures to showcase or advertise, for example, a brand or a model of the vehicle through embossed, molded, or otherwise inscribed words, logos, and/or images on the center cap.

Some known center caps are coupled to a wheel such that lug nuts that secure the wheel to the vehicle are encapsulated by the center cap. As a result, areas of retention between the lug nuts and the center cap are difficult to access because these areas are covered by the center cap, thereby making installation and removal of the center cap cumbersome. Some other known center caps are retained on the wheel by an annular flange located at an exterior portion of a central bore of the wheel. Such retention configurations involve inclusion of a flange on the central bore of the wheel during manufacture, which increases material, processing, and/or other manufacturing costs. Further, such center caps can be difficult to install and/or remove due to the covering of the central bore flange. Also, some known center caps are manufactured from metallic materials (e.g., steel, aluminum, or an alloy thereof) and can rust over time, making removal of the center cap difficult, and/or result in abrasion of the center cap and/or wheel over time.

Disclosed herein are example center caps including retention features that enable the center cap to be retained relative to the wheel via lug nuts disposed externally to the center cap. Some example center caps disclosed herein include feet extending radially from a body of the cap. In examples disclosed herein, the feet engage the lug nuts to retain the center cap relative to the wheel without encapsulating the lug nuts. Some example center caps disclosed herein cover at least a portion of the central bore without directly interfacing the central bore for retention. Some example center caps disclosed herein can be coupled to the wheel before or after the installation of the lug nuts. As a result of the retention of the example center caps disclosed herein via lug nuts that are disposed external to the center cap, the disclosed center caps provide for improved ease of installation and access. Some example center caps disclosed herein are composed of a compressive and/or plastic material to further facilitate ease of installation and removal while preventing rusting and/or abrasion of the center cap and/or wheel.

FIG. 1 is an isometric view of an example center cap 100 for covering a central bore of a wheel in accordance with teachings of this disclosure. In particular, FIG. 1 shows a first side 101 of the example center cap 100, or an exterior facing surface relative to a wheel assembly when the center cap 100 is installed on the wheel assembly. In some examples, the center cap 100 is formed from a material such as nylon, polyethylene, polystyrene, etc. and manufactured using injection molding. The example center cap 100 of FIG. 1 can include other materials and/or be manufactured using other manufacturing processes (e.g., additive manufacturing processes, subtractive manufacturing processes).

A body 102 of the example center cap 100 of FIG. 1 includes a first face 104. In the example of FIG. 1, the first face 104 is a flat surface and defined by a circular first edge 106. In other examples, the first face 104 could have other shapes (e.g., oval), contours, and/or inscriptions (e.g., branding features). In some examples, the first face 104 includes apertures (e.g., slots) or other means to receive a separately molded modular ornament (e.g., for purposes of branding) using fastening means (e.g., clips). In other examples, the first face 104 does not include any features.

The body 102 of the example center cap 100 includes protrusions extending outward relative to the first face 104 of the body 102. In the example of FIG. 1, the center cap 100 includes a first protrusion 110, a second protrusion 132, a third protrusion 134, a fourth protrusion 136, a fifth protrusion 138, and a sixth protrusion 140. The example center cap 100 can include additional or fewer protrusions. In the example of FIG. 1, one or more portions of the body 102 defined between the first face 104 and the protrusions 110, 132, 134, 136, 138, 140 can be smooth, or include contours or chamfers defining geometrical designs. Also, the surfaces defining the protrusions 110, 132, 134, 136, 138, 140 can be smooth, or include contours or chamfers defining geometrical designs.

In the example of FIG. 1, the protrusions 110, 132, 134, 136, 138, 140 are spaced apart such that two adjacent protrusions 110, 132, 134, 136, 138, 140 define a first gap 111 therebetween. For instance, the first gap 111 is defined between the first protrusion 110 and the second protrusion 132, another first gap 111 is defined between the second protrusion 132 and the third protrusion 134, etc.

The body 102 of the example center cap 100 of FIG. 1 also includes legs extending outward relative to the first face 104 of the body 102, where the legs are disposed in each of the first gaps 111 formed between the protrusions 110, 132, 134, 136, 138, 140. FIG. 1 illustrates a first leg 112 disposed between the first protrusion 110 and the second protrusion 132, a second leg 142 disposed between second protrusion 132 and the third protrusion 134, and a third leg 144 disposed between the third protrusion 134 and the fourth protrusion 136. As discussed below (FIG. 2), the body 102 of the center cap 100 includes legs disposed in the first gaps 111 defined between the remaining protrusions 136, 138, 140.

For illustrative purposes, the example second leg 142 of the center cap 100 will be discussed in detail with the understanding that the other legs of the example center cap 100 of FIG. 1 (e.g., the first leg 112, the third leg 144) are substantially the same as the second leg 142. However, in other examples, the other legs of the example center cap 100 of FIG. 1 (e.g., the first leg 112, the third leg 144) are different from the second leg 142. As used herein, "substantially the same" means identical or almost identical (e.g. due to manufacturing tolerances). As shown in FIG. 1, the second leg 142 is at least partially suspended from the body 102 of the center cap 100 via second gaps 113 defined in the body 102. Thus, the example second leg 142 is a cantilever-like extrusion or tab extending from the body 102 and is spaced apart from the second protrusion 132 and the third protrusion 134 via the gaps 113. As disclosed herein, this configuration allows for relative movement (e.g., temporary elastic deformation through bowing) between the second leg 142 and the body 102.

The example second leg 142 includes a foot 114. As shown in FIG. 1, the foot 114 extends from the second leg 142 radially outward relative to the body 102 of the center cap 100. In some examples, the foot 114 of the second leg 142 includes a first face 116 at least partially defined by an edge 118. In the example of FIG. 1, the first face 116 is a chamfered face that forms a concave, curved (e.g., half-moon or semicircular) surface. The first face 116 and/or the edge 118 can have other shapes, sizes, or geometries than shown in FIG. 1 (e.g., a round shape).

The example foot 114 of FIG. 1 includes a second face 119 extending from the edge 118 away from the first face 116. In the example of FIG. 1, the second face 119 of the foot 114 is angled relative to the first face 116 such that the edge 118 between the first face 116 and the second face 119 is disposed radially furthest from the body 102. Put another way, the first face 116 of the foot 114 is angled outward relative to the body 102 of the center cap 100 and the second face 119 is angled toward the body 102, with the edge 118 being the outermost portion of the foot 114. In the example of FIG. 1, the second face 119 of the foot 114 has the same geometric properties (e.g. shapes, contours) as the first face 116. However, in other examples, the second face 119 may have different geometric properties than the first face 116.

Figure 2:
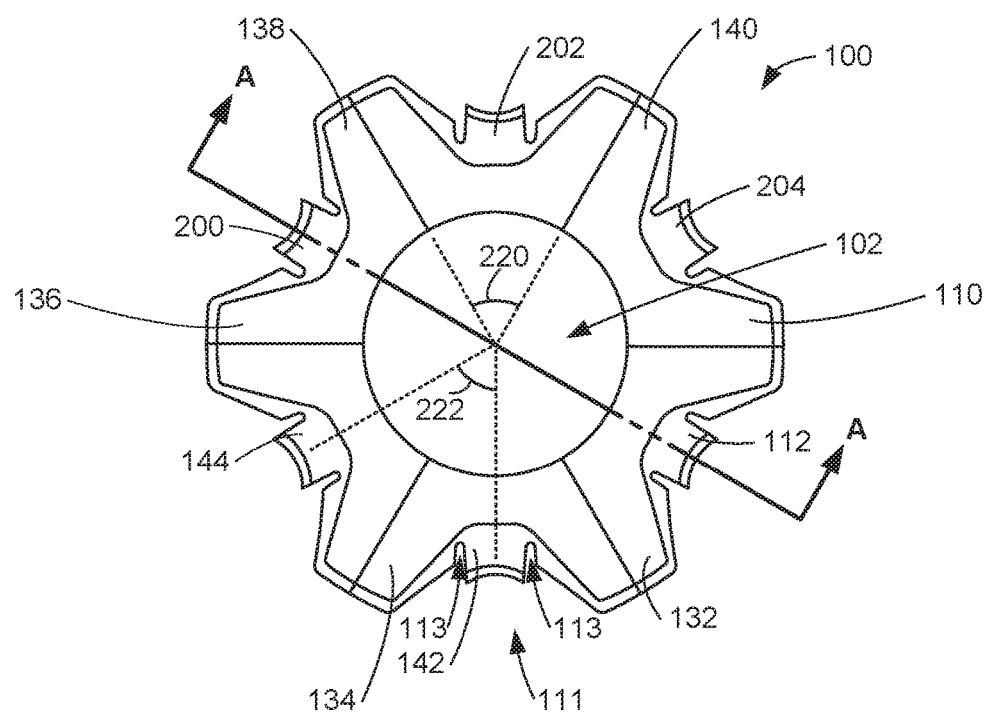
FIG. 2 is a top view of the example center cap of FIG. 1.

FIG. 2 is a top view of the example center cap 100 of FIG. 1. As shown in FIG. 2, a fourth leg 200 is disposed between the fourth protrusion 136 and the fifth protrusion 138, a fifth leg 202 is disposed between the fifth protrusion 138 and the sixth protrusion 140, and a sixth leg 204 is disposed between the sixth protrusion 140 and the first protrusion 110. Thus, the example center cap 100 of FIGS. 1 and 2 includes six protrusions 110, 132, 134, 136, 138, 140 and six legs 112, 142, 144, 200, 202, 204 extending radially from the body 102 of the center cap 100, with the legs 112, 142, 144, 200, 202, 204 spaced apart from the protrusions 110, 132, 134, 136, 138, 140 via the gaps 113. The example center cap 100 can have additional or fewer protrusions and/or legs than shown in FIG. 2 (e.g., four protrusions, eight protrusions).

The example center cap 100 of FIG. 2 is symmetrical with respect to a size (e.g., width, length), shape, and placement of the respective protrusions 110, 132, 134, 136, 138, 140 and the respective legs 112, 142, 144, 200, 202, 204 relative to the body 102. In the example of FIG. 2 where the center cap 100 has six protrusions 110, 132, 134, 136, 138, 140, angle 220 between protrusion 138 and protrusion 140 may be 60°. For example, due to manufacturing tolerances, the angle 220 may be between 50° and 70°. In other examples, angle 220 may be adjusted to account for, for example, a different number of protrusions. For instance, in examples in which the center cap 100 has four protrusions, the angle between two adjacent protrusions may be 90°. In such examples, due to manufacturing tolerances, the angle between the two adjacent protrusions may be between 80° and 100°. Though angle 220 is shown herein as the angle between protrusion 138 and protrusions 140, it is understood that the angle 220 could represent the angle between any two adjacent protrusions 110, 132, 134, 136, 138, 140. In the example of FIG. 2 where the center cap 100 has six legs 112, 142, 144, 200, 202, 204, angle 222 between leg 142 and leg 144 may be 60°. For example, due to manufacturing tolerances, the angle 222 may be between 50° and 70°. In other examples, angle 222 may be adjusted to account for, for example, a different number of legs (e.g., four legs, where an angle between two adjacent legs ranges from between 80° and 100°). Though angle 222 is shown herein as the angle between leg 142 and leg 144, it is understood that the angle 220 could represent the angle between any two adjacent legs 112, 142, 144, 200, 202, 204. For example, as shown in FIG. 2 of the protrusions 110, 132, 134, 136, 138, 140, each extends outward from the body 102 a greater radial distance than a radial distance each of the legs 112, 142, 144, 200, 202, 204 extends from the body 102. The radial lengths of the protrusions 110, 132, 134, 136, 138, 140 of the example center cap 100 of FIG. 2 are substantially the same (e.g., identical or almost identical due to manufacturing tolerances). Also, the radial lengths of the legs 112, 142, 144, 200, 202, 204 of the example center cap 100 of FIG. 2 are substantially the same (e.g. identical or almost identical due to manufacturing tolerances). As another example, widths of the respective first gaps 111 defined between adjacent pairs of the protrusions 110, 132, 134, 136, 138, 140 are substantially equal such that the protrusions 110, 132, 134, 136, 138, 140 are substantially equally spaced apart about the body 102. As used herein, "substantially equal" means equal or almost equal due to manufacturing tolerances. Also, the legs 112, 142, 144, 200, 202, 204 of example center cap 100 disposed in the gaps 111 can be substantially equally spaced apart about the body 102.

In other examples, the center cap 100 is not symmetrical with respect to the size, shape, and/or placement of the respective protrusions 110, 132, 134, 136, 138, 140 and/or the respective legs 112, 142, 144, 200, 202, 204. For example, although the example center cap 100 of FIGS. 1 and 2 includes one leg 112, 142, 144, 200, 202, 204 disposed in each of the first gaps 111 formed between two adjacent protrusions 110, 132, 134, 136, 138, 140, in other examples, two or more legs can be disposed in one or more of the first gaps 111. In some examples, the center cap 100 includes additional or fewer number of protrusions 110, 132, 134, 136, 138, 140 than legs 112, 142, 144, 200, 202, 204. In other examples, the center cap 100 does not include any protrusions 110, 132, 134, 136, 138, 140.

Figure 3:
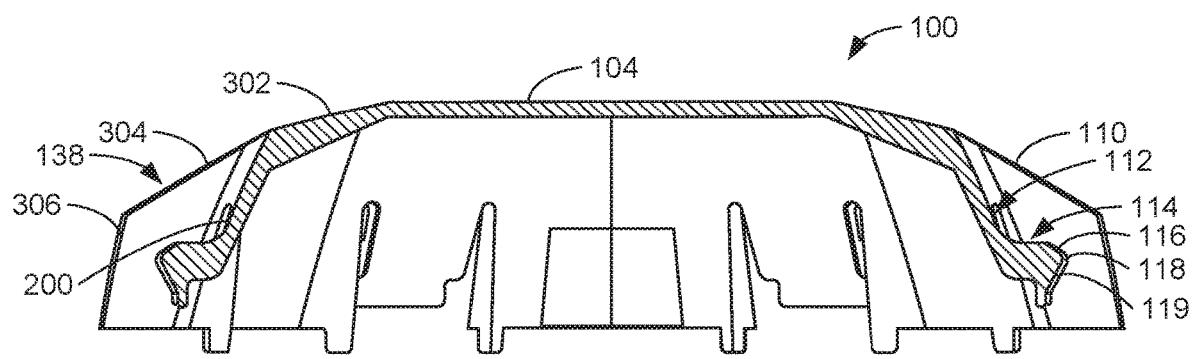
FIG. 3 is a cross-sectional view of the example center cap of FIGS. 1 and 2, taken along the A-A line of FIG. 2.

FIG. 3 is a cross-sectional view of the example center cap 100 of FIGS. 1 and 2, taken along the A-A line of FIG. 2. In particular, FIG. 3 shows cross-sectional view of the example first protrusion 110, the example first leg 112, the example fourth leg 200, and the example fifth protrusion 138 of the center cap 100. However, in view of the symmetry of the example center cap 100 of FIGS. 1 and 2, a cross-sectional view taken along a different line of the center cap 100 is the same or the substantially same (e.g., identical or almost identical due to manufacturing tolerances) as the example cross-sectional view shown in FIG. 3.

As shown in FIG. 3, the protrusions 110, 138 are angled relative to the first face 104 of the center cap 100. For example, the fifth protrusion 138 includes a first angled portion 302 disposed at a first angle (downward in the orientation of FIG. 3) relative to the first face 104, a second angled portion 304 disposed at a second angle relative to the first face 104, and a third angled portion 306 disposed at a third angle relative to the first face 104. In some examples, the second angle of the second angled portion 304 is greater than the first angle of the first angled portion 302. Also, in some examples, the third angle of the third angled portion 306 is greater than the first angle of the first angled portion 302 and the second angle of the second angled portion 304.

In other examples, two or more of the angles of the first, second, and/or third portions 300, 302, 304 are substantially the same. In some examples, the angled portions 302, 304, 306 are discrete angled portions distinguished by, for example, an edge, a round, or a fillet. In other examples, two or more of the angled portions 302, 304, 306 form a uniform surface (e.g., a uniform sloped surface).

The cross-sectional view of FIG. 3 also illustrates the first face 116, the edge 118, and the second face 119 of the foot 114 of the first leg 112. As shown in FIG. 3, the first face 116 and second face 119 protrude from the foot 114 and define the edge 118. As also shown in FIG. 3, the edge 118 is disposed radially furthest from the body 102.

Figure 4:
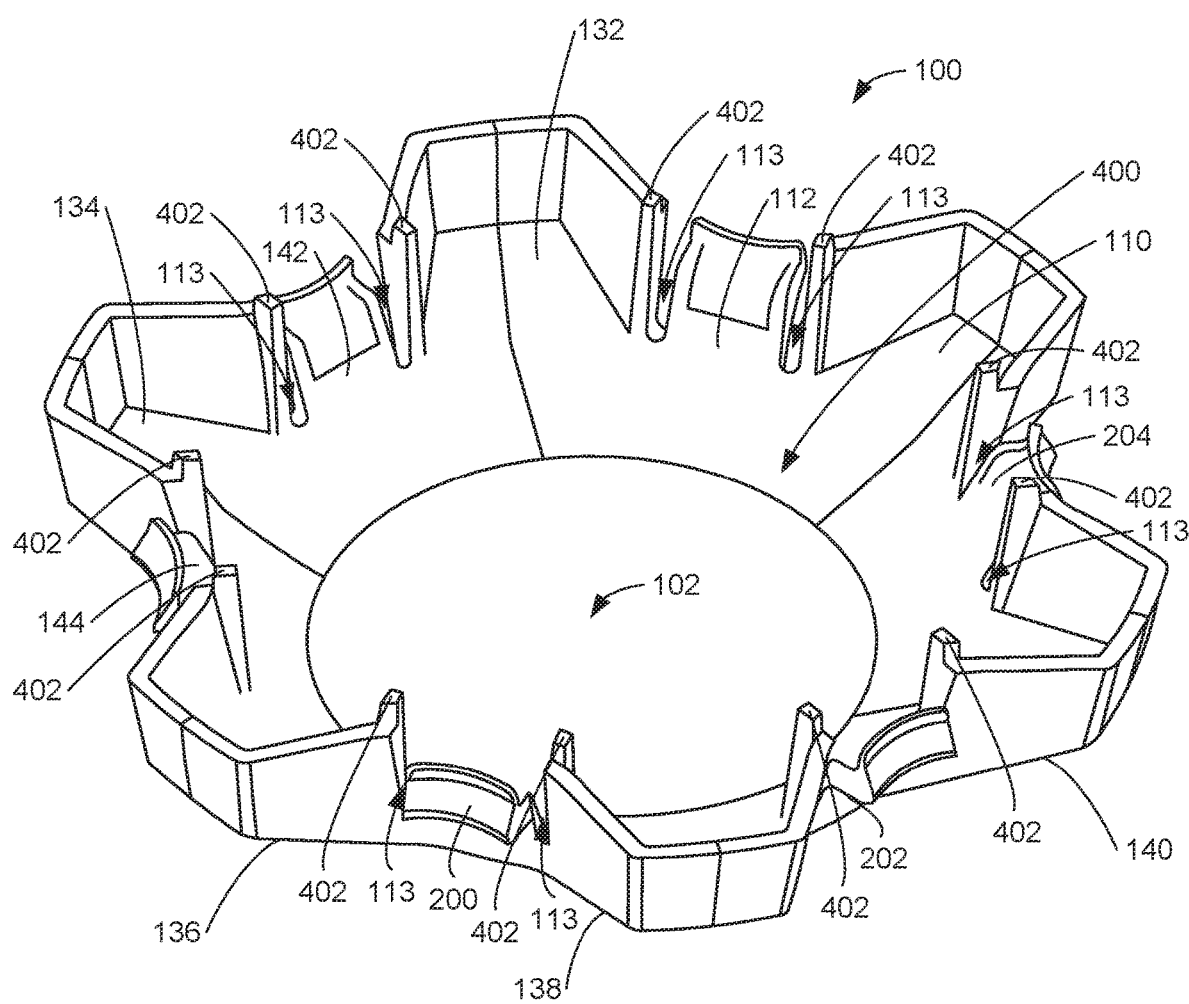
FIG. 4 illustrates a second side of the example center cap of FIG. 1.

FIG. 4 illustrates a second side 400 of the example center cap 100 opposite the first side 101 of the center cap 100 shown in FIG. 1. In use, at least a portion of the second side 400 of the center cap 100 interfaces with a wheel assembly when the center cap 100 is coupled to the wheel assembly. Thus, the second side 400 of the center cap 100 is an inward facing surface relative to the wheel assembly.

The example second side 400 of the body 102 of the center cap 100 includes a plurality of supports 402 (e.g., extrusions, standoffs, protrusions, etc.). When the example center cap 100 is coupled to a wheel, the supports 402 interface with (e.g., contact) the wheel to which the center cap 100 is coupled (e.g., mounted). In some examples, the supports 402 are spaced annularly around the second side 400 of the body 102 of the center cap 100. The supports 402 can protrude from a portion of the body 102 proximate to the protrusions 110, 132, 134, 136, 138, 140. In some examples, the supports 402 are annularly arranged in pairs, one of each pair located on either side of gaps 113 that space apart the respective protrusions 110, 132, 134, 136, 138, 140 from the corresponding legs 112, 142, 144, 200, 202, 204. The example support(s) 402 of FIG. 4 can have different shapes and/or sizes (e.g., heights, widths) than shown in FIG. 4. For example, one or more of the supports 402 may extend across a width of a corresponding protrusion 110, 132, 134, 136, 138, 140 (e.g., to form a support wall).

Figure 5:
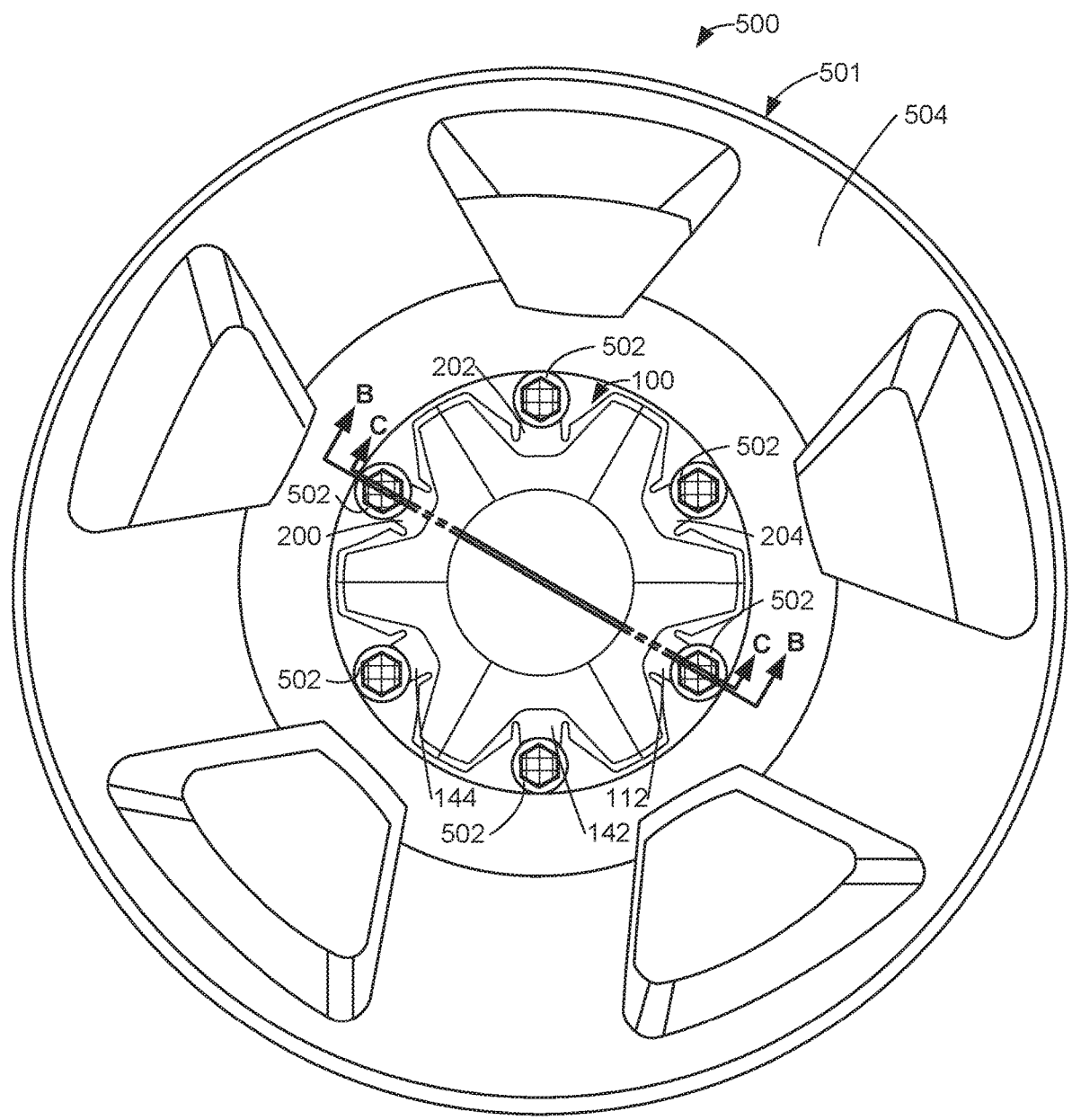
FIG. 5 is a top view of an example wheel assembly including the example center cap of FIGS. 1-4.

FIG. 5 is a top view of an example wheel assembly 500 including the example center cap 100 of FIGS. 1-5 in an installed state in which the center cap 100 is coupled to the wheel assembly 500. The wheel assembly 500 of FIG. 5 includes a wheel 501. In use, the wheel assembly 500 is coupled to an example vehicle such as an automobile, truck, or semi-trailer. In some examples, there are four, six, eighteen, or any other number of wheels 501 coupled to each example vehicle, some or all of which include the example center cap 100. The example wheel 501 includes a first face 504, which faces away from the vehicle to which the wheel 501 is coupled.

As shown in FIG. 5, the center cap 100 is coupled to the wheel 501 via a plurality of lug nuts 502. The lug nuts 502 interface with respective portions of the legs 112, 142, 144, 200, 202, 204 of the center cap 100 to retain the center cap 100 from axial and rotational movement relative to the wheel 501. In the example of FIG. 5, the lug nuts 502 are disposed externally to center cap 100. The external location of the lug nuts 502 relative to the center cap 100 provides for ease of user access to the lug nuts 502 when the center cap 100 is installed on the wheel assembly 500. In the example of FIG. 5, there are six lug nuts 502 corresponding to the six legs 112, 142, 144, 200, 202, 204 of the example center cap 100. Other numbers of lug nuts can be used (e.g., less than six) based on the number of legs and/or protrusions. For instance, in examples in which the center cap 100 includes four legs, four lug nuts 502 may be used. In other examples, the lug nuts 502 are replaced with lug/wheel bolts (e.g., bolts with a head and threaded shaft). In some of these examples, the heads of the lug/wheel bolts interface with respective portions of the legs 112, 142, 144, 200, 202, 204.

Figure 6:
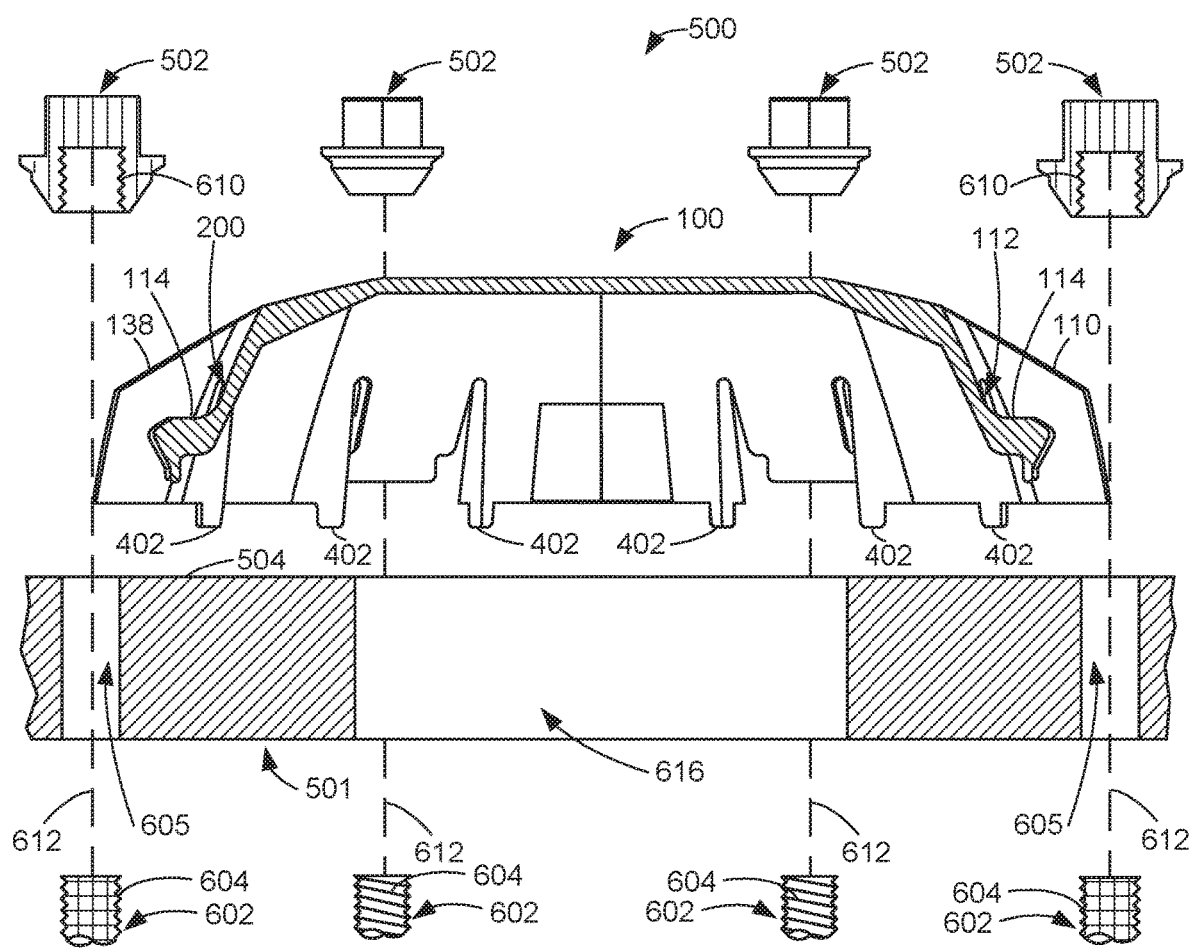
FIG. 6 is an exploded cross-sectional view of the example wheel assembly of FIG. 5 taken along the B-B line of FIG. 5.

FIG. 6 is an exploded cross-sectional view of the example wheel assembly 500 of FIG. 5 including the center cap 100, taken along the B-B line of FIG. 5. The example wheel assembly 500 includes wheel studs 602 having threads 604 to interface with the lug nuts 502. The wheel studs 602 extend through bores 605 defined in the wheel 501 to enable the threads 604 of wheel studs 602 to interface with threads 610 of lug nuts 502, thereby forming a threaded connection. In the example exploded view of FIG. 6, dashed lines 612 represent the coupling between the respective wheel studs 602 and the corresponding lug nuts 502 via the bores 605. In the example of FIG. 6, when the wheel studs 602 are coupled to the lug nuts 502, at least a portion the lug nuts 502 engage with the feet of the legs of the center cap 100 (e.g., where the first leg 112 and the fourth leg 200, each having respective feet 114, are shown in FIG. 6). As discussed herein, the engagement between the respective lug nuts 502 and the feet 114 of the center cap 100 constrains the example center cap 100 from axial and rotational movement relative to the wheel 501. The center cap 100 may, for example, move slightly (e.g., vibrate or shake) relative to the wheel 501 during, for example, operation of a vehicle to which the wheel 501 is attached.

The example wheel 501 includes a central bore 616, or an axial bore, extending through the wheel 501. In some examples, the center cap 100 is to at least partially cover the central bore 616. In some examples, the first face 504 of the wheel 501 is to interface with the supports 402. In some examples, the supports 402 help maintain the position of the center cap 100 relative to the wheel 501 by, for instance, resisting twisting of the center cap 100. Thus, as a result of the interface between the supports 402 of the center cap 100 and the first face 504 of the wheel 501 and/or the interface between the lug nuts 502 and the feet 114 of the center cap 100, the center cap 100 is constrained from movement relative to the wheel 501. The center cap 100 may, for example, move slightly (e.g., vibrate or shake) relative to the wheel 501 during, for example, operation of a vehicle to which the wheel 501 is attached.

Figure 7:
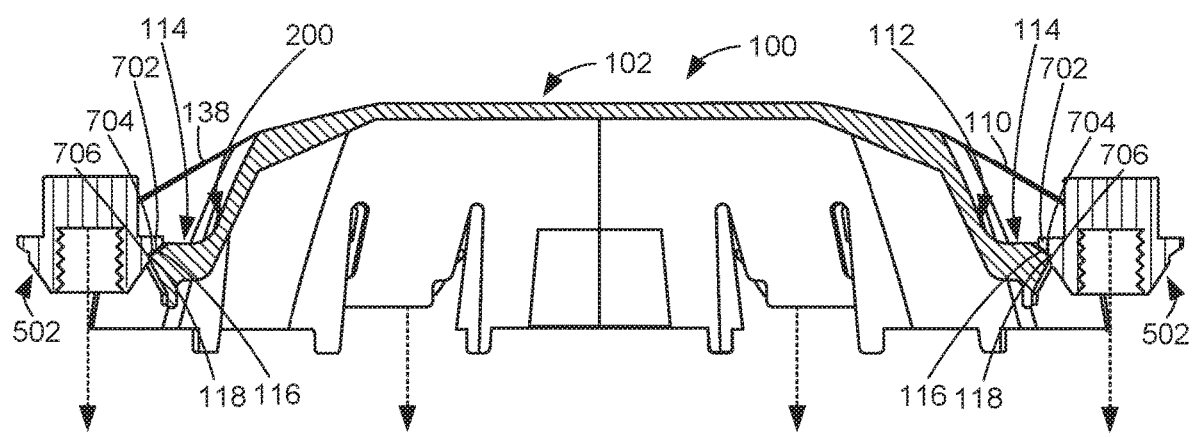
FIG. 7 is a cross-sectional view of the example center cap of FIGS. 1-5 and corresponding lug nuts taken along the C-C line of FIG. 5.

FIG. 7 is a cross-sectional view of the example center cap 100 of FIG. 1 and the lug nuts 502 of the wheel assembly 500 of FIG. 5, taken along the C-C line of FIG. 5. For illustrative purposes, the other components of the wheel assembly 500 of FIG. 5 (e.g., the wheel 501, the wheel studs 602) are not shown in FIG. 7. In particular, FIG. 7 shows a cross-sectional view of the example first protrusion 110, the example first leg 112, the example fourth leg 200, and the example fifth protrusion 138 of the center cap 100. FIG. 7 also shows a first one of the lug nuts 502 in engagement with the first leg 112 and a second one of the lug nuts 502 in engagement with the fourth leg 200. In view of the symmetry of the example center cap 100 of FIG. 1, a cross-sectional view taken along a different line of the center cap 100 when the center cap 100 is in the installed state is the same or the substantially same as the example cross-sectional view shown in FIG. 7. Thus, the engagement between the lug nuts 502 and the other legs of the center cap 100 is the same or substantially the same as shown in FIG. 7.

As shown in FIG. 7, each of the lug nuts 502 contains an annular flange 702 having a first annular face 704. A second annular face 706 of the lug nut 502 is defined beneath the annular flange 702. In the example of FIG. 7, at least a portion of the first annular face 704 of the first one of the lug nuts 502 interfaces with at least a portion of the chamfered face 116 of the foot 114 of the first leg 112 of the center cap 100. Also, at least a portion of the second annular face 706 of the first one of the lug nuts 502 interfaces with at least a portion of the edge 118 defining the chamfered face 116 of the foot 114 of the first leg 112. Also, in the example of FIG. 7, at least a portion the first annular face 704 of the second one of the lug nuts 502 interfaces with at least a portion of the chamfered face 116 of the foot 114 of the fourth leg 200 of the center cap 100. Also, at least a portion of the annular face 706 of the second one of the lug nuts 502 interfaces with at least a portion of the edge 118 defining the chamfered face 116 of the foot 114 of the fourth leg 200. As discussed above, the chamfered face 116 and the edge 118 protrude outward from each foot 114 relative to the body 102 of the center cap 100, which maximizes a contact area of each foot 114 with the annular faces 704, 706 of the lug nut 502.

As also discussed above, the first chamfered faces 116 and the edge 118 of the example feet 114 of the center cap 100 are curved such that the feet 114 have a concave shape (e.g., a half-moon or semicircular shape). The concave curve defined by the chamfered face 116 and the edge 118 of the respective feet 114 further maximizes contact between the flange 702 of the respective lug nuts 502 and the feet 114. Also, as shown in FIG. 7, the chamfered faces 116 of the respective feet 114 are disposed under the flange 702 of the respective lug nuts 502, which provides for retention of the center cap 100 via the externally disposed lug nuts 502. In some examples, a radius of curvature of the respective first annular faces 704 of the lug nuts 502 is substantially less than or equal to a radius of curvature of the chamfered faces 116 of the respective feet 114 to enable at least a portion of the first annular faces 704 of the lug nuts 502 to interface with at least a portion of the chamfered faces 116 of the feet 114 of the center cap 100. In some examples, the radius of curvature of the second annular faces 706 is less than or equal to the radius of curvature of the edges 118 to enable at least a portion of the second annular faces 706 of the lug nuts 502 to interface with at least a portion of the edges 118 of the feet 114 of the center cap. As a result, the center cap 100 is retained or coupled to the wheel 501 (FIG. 5) by the lug nuts 502. The retention of the center cap 100 via the engagement of the lug nuts 502 with the feet 114 of the center cap 100 substantially prevents translation (e.g., radial and/or axial movement) of the example center cap 100 relative to the wheel 501.

Thus, in the example of FIG. 7, the lug nuts 502 retain the center cap 100 via an interference fit between the lug nuts 502 and the feet 114 of the center cap 100. As discussed herein, the example center cap 100 includes a plastic and/or flexible material. The engagement between the flange 702 of the respective lug nuts 502 with the corresponding feet 114 of the center cap 100 causes the legs of the center cap 100 (e.g., the legs 112, 200) to be pushed inward, which holds the center cap 100 in retention. In some examples, a diameter of the center cap 100 (e.g., where the diameter extends from an edge 118 of a first one of the feet 114 to a corresponding edge 118 of a second one of the feet 114 opposite the first one of the feet 114) when the center cap 100 is coupled to the wheel via the lug nuts 502 is less than a diameter of the center cap 100 when the center cap 100 is not coupled to the wheel due to the elastic deformation of the center cap 100 via the lug nuts 502. The elastically deformable material of center cap 100 facilitates the interference fit of the center cap 100 with the lug nuts 502, which reduces movement (e.g., twisting, rotation) of the center cap 100 while enabling the center cap to be secured with the lug nuts 502 to be disposed external to the center cap 100.

Figure 8:
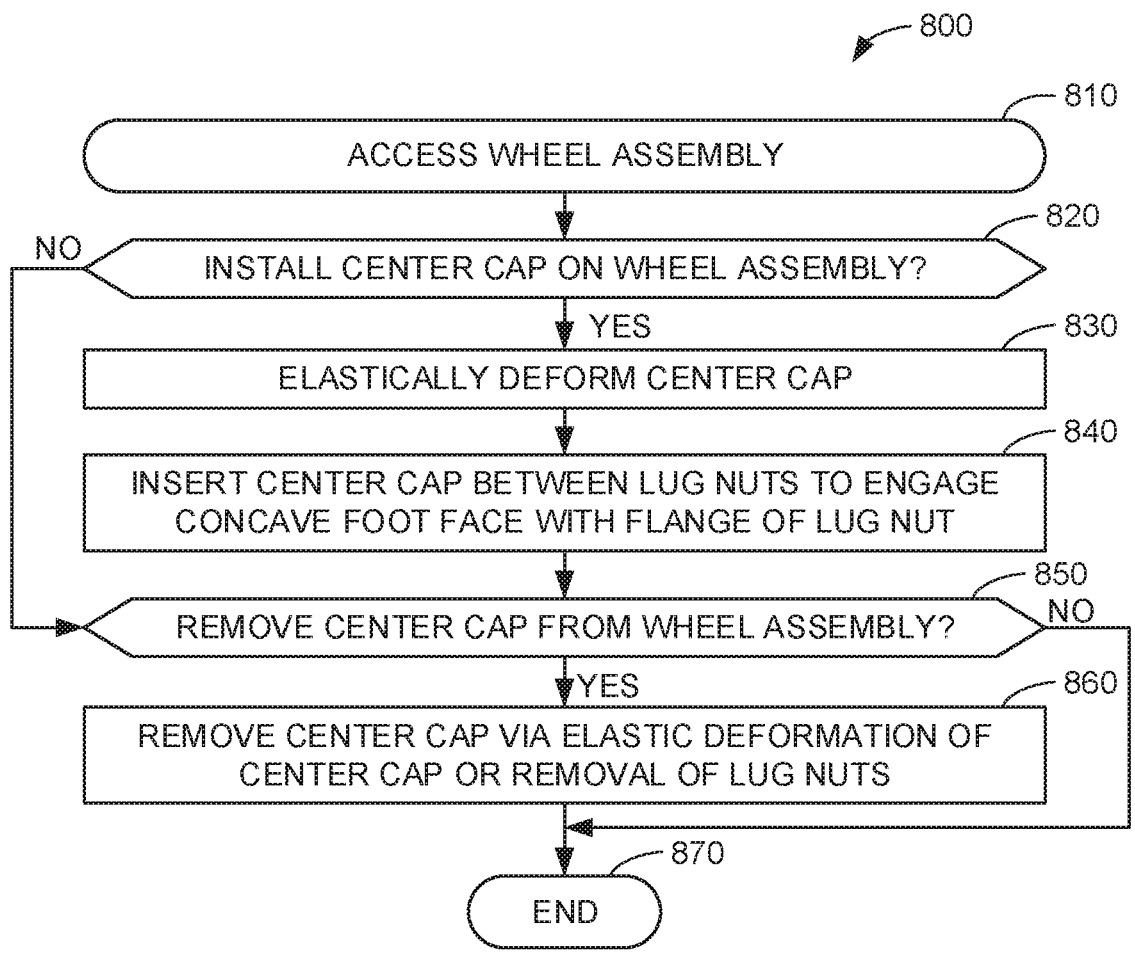
FIG. 8 is a flowchart of an example method for installing the example center cap of FIGS. 1-7 on a wheel assembly in accordance with teachings of this disclosure.

FIG. 8 is a flowchart of an example method 800 for installing and/or removing a center cap (e.g., the example center cap 100 of FIGS. 1-7) on a wheel assembly such as the example wheel assembly 500 of FIG. 5 in accordance with teachings disclosed herein. The example method begins with accessing a wheel assembly (e.g., the wheel assembly 500 of FIG. 5) in which a wheel (e.g., the wheel 501) is secured to the wheel assembly via lug nuts (e.g., the lug nuts 502) and wheel studs (e.g., the wheel studs 602) (block 810).

The example method 800 includes a determination as to whether a center cap such as the example center cap 100 of FIGS. 1-7 should be installed on the wheel assembly 500 (block 820). For example, the center cap 100 may be installed as part of manufacture of the wheel assembly 500 or for purposes of replacing a center cap that has been removed from the wheel assembly 500.

If the center cap 100 is to be installed on the wheel assembly 500, block 830 of the example method 800 includes elastically deforming the center cap 100 to reduce a diameter of the center cap 100 (e.g., at least partially flexing the feet 114 radially inward relative to the body 102 and/or bending the body 102 of the center cap 100, etc.). In some examples, during flexure, the legs 112 and feet 114 of the example center cap 100 are moved radially inward relative to the first face 104 of the center cap 100. In some examples, the diameter of the center cap 100 during elastic deformation is less than the diameter of the center cap 100 when the center cap 100 is not elastically deformed.

At block 840, the center cap 100 is inserted between the (previously installed) lug nuts 502 of the wheel assembly 500. To insert the center cap 100 between the lug nuts 502, the feet 114 of the center cap 100 are aligned with the lug nuts 502 and the protrusions 110, 132, 134, 136, 138, 140 of the center cap 100 are aligned to be disposed in the gaps defined between the lug nuts 502. The center cap 100 is positioned relative to the first face 504 of the wheel assembly 500 until the supports 402 on the second side 400 of the center cap 100 engage the first face 504 of the center cap 100. In some examples, when the center cap 100 is disposed against the first face 504 of the wheel assembly 500, the center cap 100 expands from the elastically deformed position (e.g., to alleviate internal stresses) until the concave angled faces 116 and edges 118 of the feet 114 of the center cap 100 engage the annular face(s) 704, 706 of the respective lug nuts 502. In some examples, one or more of feet 114 are positioned to engage one or more of the lug nuts 502 prior to elastic deformation, such that the interface between the foot 114 and the lug nut 502 can be used as leverage to elastically deform center cap 100.

In the example of FIG. 8, if the center cap is not to be installed at block 820 because, for instance, the center cap 100 is already installed on the wheel assembly 500, example method 800 includes a determination as to whether the center cap 100 should be removed from the wheel assembly 500 (block 850). In some examples, the decision at block 850 as to whether to remove the center cap 100 from the wheel assembly 500 is made after the center cap 100 is installed on the wheel assembly 500 (blocks 830, 840) for replacement purposes, to access one or more portions of the wheel covered by the center cap 100, etc.

If the center cap 100 is to be removed from the wheel assembly 500, the example method 800 includes either leaving the lug nuts 502 coupled to the wheel assembly 500 and elastically deforming the center cap 100 to remove the center cap 100 or removing the lug nuts 502 from the wheel assembly 500 and removing the center cap 100 (block 860). In examples in which the lug nuts 502 are removed from the wheel assembly by, for example, unthreading the lug nuts 502 from the wheel studs 602, the center cap 100 is no longer secured to the wheel 501 and can be removed. In examples in which the center cap 100 is removed with the lug nuts 502 remaining coupled to the wheel assembly 500, the center cap 100 can be compressed and translated axially away from the first or interfacing first face 504 of the wheel 501 until the center cap 100 is no longer retained by lug nuts 502.

The example method 800 of FIG. 8 ends after the center cap 100 has been removed from the wheel assembly 500 (block 870). In examples which a decision is made at block 850 not to remove the center cap 100 from the wheel assembly 500, the method 800 of FIG. 8 also ends.

Figure 9:
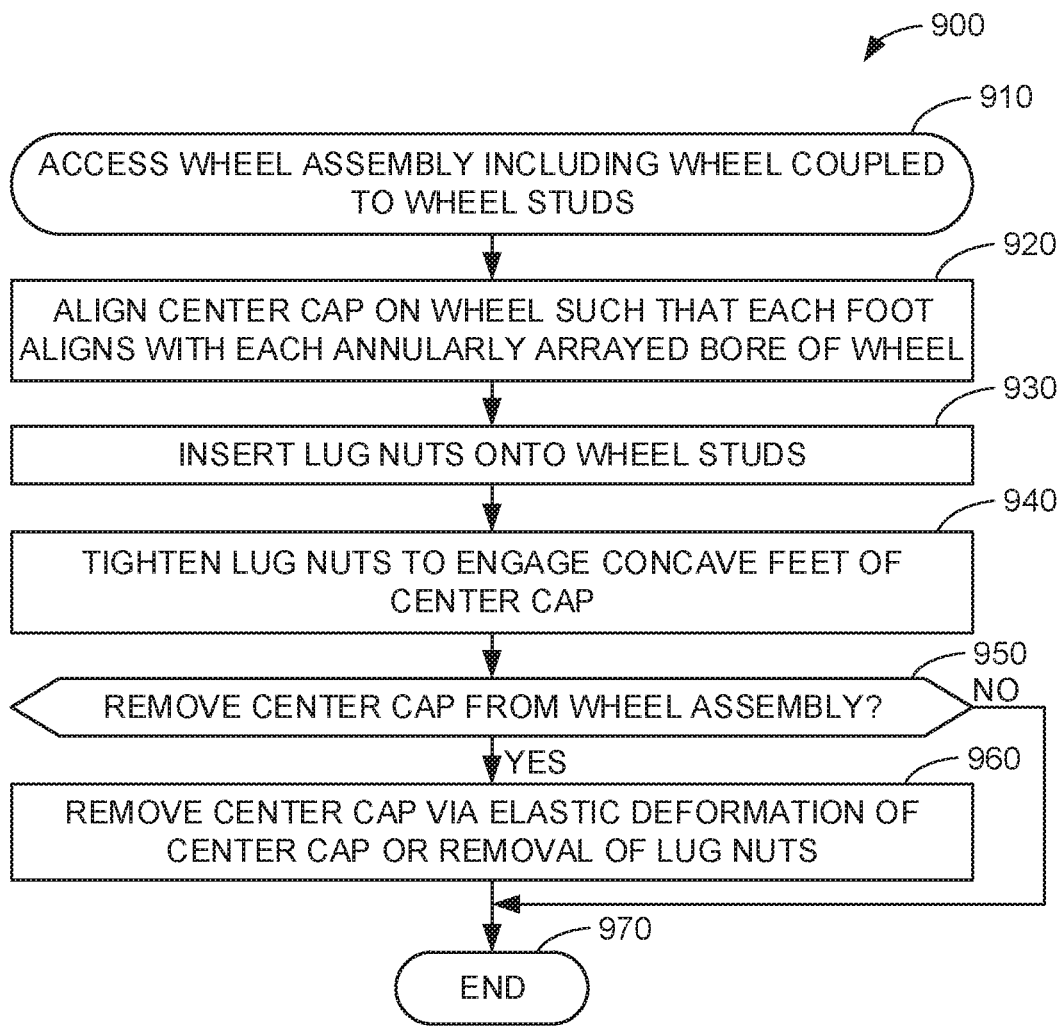
FIG. 9 is a flowchart of another example method for installing the example center cap of FIGS. 1-7 on a wheel assembly in accordance with teachings of this disclosure.

FIG. 9 is a flowchart of another example method 900 for installing a center cap such as the example center cap 100 of FIGS. 1-4 on a wheel assembly such as wheel assembly 500 of FIG. 5 in accordance with teachings disclosed herein. The method 900 begins with accessing a wheel assembly in which the wheel 501 has been placed onto the wheel studs 602 (e.g., the bores 605 have received wheel studs 602) (block 910).

At block 920, example center cap 100 is placed onto the first face 504 of example wheel 501 and is aligned such that each foot 114 (e.g., the concave chamfered face 116 and the edge 118 of each foot) of the legs 112, 142, 144, 200, 202, 204 of the center cap 100 is substantially axially aligned with the corresponding annularly arrayed bore 605 of the wheel 501. As used herein, "substantially axially aligned" refers to either a state of alignment or a state where the concave profile of the concave faces 116 and concave edges 118 of the feet 114 of the center cap 100 are to at least partially engage the annular faces 704, 706 of the lug nuts 502 when they first interface. When the center cap 100 is disposed on the first face 504 of the wheel 501, the supports 402 of the second side 400 of the center cap 100 engage the first face 504 of the example wheel 501.

At block 930, the lug nuts 502 are threaded onto the exposed tips of the wheel studs 602.

At block 940, the lug nuts 502 are tightened such that the lug nuts 502 engage at least a portion of the center cap 100 to secure the center cap 100 to the wheel 501. In the example of FIG. 9, when a particular lug nut 502 is tightened, the annular face(s) 704, 706 of the lug nut 502 engages the concave face 116 and the concave edge 118 of a corresponding foot 114 of the center cap 100. In the case that there is substantial axial alignment but not exact alignment between the annular faces 704, 706 of the lug nuts 502 and the concave faces 116 and concave edges 118 of the feet 114 of the center cap 100, the tightening interface of the annular faces 704, 706 and the concave faces 116 and concave edges 118 will urge the feet 114 into an aligned state with the bores 605. As result, the center cap 100 is restrained from axial and rotational movement relative to the example wheel 501 via the interference fit with the lug nuts 502.

The example method 900 includes a determination as to whether a center cap should be removed from the wheel assembly 500 (block 950). A decision to remove the center cap 100 may be for replacement purposes, to access one or more portions of the wheel covered by the center cap 100, etc.

If the center cap 100 is to be removed from the wheel assembly 500, the example method 900 includes either leaving the lug nuts 502 coupled to the wheel assembly 500 and elastically deforming the center cap 100 to remove the center cap 100 or removing the lug nuts 502 from the wheel assembly 500 and removing the center cap 100 (block 960). In examples in which the lug nuts 502 are removed from the wheel assembly by, for example unthreading the lug nuts 502 from the wheel studs 602, the center cap 100 is no longer secured to the wheel 501 and can be removed. In examples in which the center cap 100 is removed with the lug nuts 502 remaining coupled to the wheel assembly 500, the center cap 100 can be compressed and translated axially away from the first or interfacing first face 504 of the wheel 501 until the center cap 100 is no longer retained by lug nuts 502.

The example method 900 of FIG. 9 ends after the center cap 100 has been removed from the wheel assembly 500 (block 970). In examples which a decision is made at block 950 not to remove the center cap 100 from the wheel assembly 500, the method 900 of FIG. 9 also ends.

Although the example methods 800, 900 are described with reference to the respective flowcharts illustrated in FIGS. 8 and 9, many other methods of installing and/or removing the example center cap 100 of FIGS. 1-4 may alternatively be used. For example, the order of execution of the blocks may be changed, and/or some of the blocks described may be changed, eliminated, or combined. Similarly, additional operations may be included in the wheel center cap installation process before, in between, or after the blocks shown in FIGS. 8 and/or 9.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

From the foregoing, it will be appreciated that example wheel center caps and related methods have been disclosed herein that provide retention of the center cap relative to the wheel via lug nuts disposed externally to the center cap. Example center caps disclosed herein include extensions (e.g., feet) that interface with lug nuts, where the lug nuts hold the center cap in retention and prevent rotation of the center cap relative to the wheel. As a result of the interface between the center cap and the lug nuts external to the center cap, the example center caps disclosed herein facilitate ease of installation and replacement of the center cap.

An example wheel center cap includes a body, a first protrusion extending radially outward from the body, and a second protrusion extending radially outward from the body. The first and second protrusions define a gap therebetween. The example wheel center cap includes a leg disposed in the gap and coupled to the body. The leg includes a foot. The foot extends radially outward relative to the body. The foot includes a chamfered face facing away from the body.

In some examples, the wheel center cap includes a third protrusion and a fourth protrusion extending radially from the body. The third and fourth protrusions are spaced apart from the first and second protrusions.

In some examples, the foot of the wheel center cap is a first foot. The wheel center cap further includes a second foot disposed between the third protrusion and the fourth protrusion.

In some examples, the first protrusion of the wheel center cap extends a first radial distance from the body, and the foot of the wheel center cap extends a second radial distance from the body. The first radial distance is greater than the second radial distance.

In some examples, the body of the wheel center cap includes a plastic material.

In some examples, the foot is flexible relative to the body of the wheel center cap.

In some examples, the foot of the example wheel center cap is a first foot. The body of the example wheel center cap includes six feet.

In some examples, the body of the wheel center cap includes a first face and a second face. The second face is opposite the first face, and a plurality of supports are coupled to the second face. The supports of the wheel center cap are to engage a wheel assembly.

An example apparatus includes a wheel assembly having a face and defining a plurality of bores about the face, lug nuts to be substantially axially aligned with respective ones of the bores, and a wheel center cap removably coupled to the face via the lug nuts. The wheel center cap includes a body and feet extending radially from the body. Each foot has a concave surface, where at least a portion of the respective lug nut is to engage the concave surface.

In some examples, the wheel center cap includes a plastic material.

In some examples, the lug nuts are disposed exterior to the wheel center cap when the wheel center cap is coupled to the face of the wheel assembly.

In some examples, the wheel center cap has a first surface, a second surface, and a plurality of supports coupled to the second surface. The supports are to engage the face of the wheel assembly.

In some examples, the wheel center cap is retained by the lug nuts via an interference fit.

In some examples, the concave surface of a first one of the feet is to engage a flange of a first one of the lug nuts.

An example wheel center cap includes a body and a plurality of protrusions extending from the body. The protrusions define gaps therebetween. The example wheel center cap also includes legs disposed in respective ones of the gaps. Each leg includes a foot having an angled face to engage a respective lug nut. The lug nut is to be disposed exterior to the body when the foot is engaged with the lug nut.

In some examples, the body of the example wheel center cap includes a plastic material.

In some examples, the foot of the example wheel center cap is to engage the lug nut via an interference fit.

In some examples, the body of the wheel center cap has a first face and a second face, the first face opposite the second face, and a plurality of supports coupled to the second face, the supports to engage a wheel assembly.

In some examples, the angled face of the foot of the wheel center cap has a concave profile to engage a flanged surface of the lug nut.

In some examples, the wheel center cap contains six protrusions and six legs. Each leg contains a foot.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A wheel center cap, comprising:
a body;
a first protrusion extending radially outward from the body;
a second protrusion extending radially outward from the body, a portion of the body extending between the first protrusion and the second protrusion, the portion of the body defining a first gap and a second gap; and
a leg disposed between the first protrusion and the second protrusion, the leg coupled to the body, the leg spaced apart from the first protrusion via the first gap and spaced apart from the second protrusion via the second gap, the leg including a foot, the foot extending radially outward relative to the body, the foot including a chamfered face facing away from the body.

2. The wheel center cap of claim 1, further including a third protrusion and a fourth protrusion extending radially from the body, the third and fourth protrusions spaced apart from the first and second protrusions.

3. The wheel center cap of claim 2, wherein the foot is a first foot and further including a second foot disposed between the third protrusion and the fourth protrusion.

4. The wheel center cap of claim 1, wherein the first protrusion extends a first radial distance from the body, and the foot extends a second radial distance from the body, the first radial distance greater than the second radial distance.

5. The wheel center cap of claim 1, wherein the body includes a plastic material.

6. The wheel center cap of claim 1, wherein the foot is flexible relative to the body.

7. The wheel center cap of claim 1, wherein the foot is a first foot, the body including six feet.

8. The wheel center cap of claim 1, wherein the body includes:
a first face and a second face, the second face opposite the first face; and
a plurality of supports coupled to the second face, the supports to engage a wheel assembly.

9. An apparatus, comprising:
a wheel assembly having a face and defining a plurality of bores about the face;
lug nuts substantially axially aligned with respective ones of the bores; and
a wheel center cap removably coupled to the face via the lug nuts, the wheel center cap including a body, feet extending radially from the body, each foot of the feet at least partially suspended from the body via a corresponding gap defined in the body, each foot of the feet having a concave surface, at least a portion of each lug nut to engage the concave surface of a corresponding one of the feet.

10. The apparatus of claim 9, wherein the wheel center cap includes a plastic material.

11. The apparatus of claim 9, wherein the lug nuts are disposed exterior to the wheel center cap when the wheel center cap is coupled to the face of the wheel assembly.

12. The apparatus of claim 9, wherein the wheel center cap has a first surface, a second surface, and a plurality of supports coupled to the second surface, the supports to engage the face of the wheel assembly.

13. The apparatus of claim 9, wherein the wheel center cap is retained by the lug nuts via an interference fit.

14. The apparatus of claim 9, wherein the concave surface of a first foot of the feet is to engage a flange of a first one of the lug nuts.

15. A wheel center cap comprising:
a body;
a plurality of protrusions extending from the body; and
legs disposed between respective ones of the protrusions, each leg of the legs including a foot having an angled face to engage a respective lug nut, each leg of the legs at least partially suspended from the body via a respective gap, each gap defined in a respective surface of the body extending between corresponding ones the protrusions, the respective lug nut to be disposed exterior to the body when the foot is engaged with the respective lug nut.

16. The wheel center cap of claim 15, wherein the body includes a plastic material.

17. The wheel center cap of claim 15, wherein the foot is to engage the respective lug nut via an interference fit.

18. The wheel center cap of claim 15, wherein the body includes:
a first face and a second face, the first face opposite the second face; and
a plurality of supports coupled to the second face, the supports to engage a wheel assembly.

19. The wheel center cap of claim 15, wherein the angled face of the foot has a concave profile to engage a flanged surface of the respective lug nut.

20. The wheel center cap of claim 15, wherein the wheel center cap contains six protrusions and six legs.

* * * * *